(12) United States Patent
Nishitani et al.

(10) Patent No.: US 12,062,789 B2
(45) Date of Patent: Aug. 13, 2024

(54) NON-AQUEOUS ELECTROLYTE SECONDARY BATTERY

(71) Applicant: Panasonic Intellectual Property Management Co., Ltd., Osaka (JP)

(72) Inventors: Satoshi Nishitani, Osaka Fu (JP); Masaki Deguchi, Hyogo Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 737 days.

(21) Appl. No.: 17/252,923

(22) PCT Filed: Feb. 20, 2019

(86) PCT No.: PCT/JP2019/006354
§ 371 (c)(1),
(2) Date: Dec. 16, 2020

(87) PCT Pub. No.: WO2020/003595
PCT Pub. Date: Jan. 2, 2020

(65) Prior Publication Data
US 2021/0151759 A1 May 20, 2021

(30) Foreign Application Priority Data
Jun. 29, 2018 (JP) ................. 2018-124509

(51) Int. Cl.
*H01M 4/58* (2010.01)
*H01M 4/02* (2006.01)
(Continued)

(52) U.S. Cl.
CPC ..... *H01M 4/5825* (2013.01); *H01M 10/0525* (2013.01); *H01M 10/0567* (2013.01);
(Continued)

(58) Field of Classification Search
CPC ......... H01M 10/0525; H01M 10/0567; H01M 10/0568; H01M 2004/0427
See application file for complete search history.

(56) References Cited

U.S. PATENT DOCUMENTS 9,196,903 B2 * 11/2015 Tokuda ............. H01M 10/0569
2017/0214041 A1 7/2017 Minami et al.
(Continued)

FOREIGN PATENT DOCUMENTS

| EP | 1 526 600 A1 | 4/2005 |
| JP | 2010-192327 A | 9/2010 |

(Continued)

OTHER PUBLICATIONS

International Search Report dated May 28, 2019, issued in counterpart International Application No. PCT/JP2019/006354. (2 pages).
(Continued)

*Primary Examiner* — Haroon S. Sheikh
*Assistant Examiner* — Aryana Y. Ortiz
(74) *Attorney, Agent, or Firm* — WHDA, LLP

(57) ABSTRACT

Disclosed is a non-aqueous electrolyte secondary battery including: a positive electrode; a negative electrode; and an electrolyte solution. The negative electrode contains a negative electrode active material that is capable of electrochemically absorbing and desorbing lithium. The negative electrode active material contains a lithium silicate phase and silicon particles that are dispersed in the lithium silicate phase. The lithium silicate phase is an oxide phase that contains lithium, silicon, and oxygen. The atomic ratio O/Si of oxygen relative to silicon in the lithium silicate phase is greater than 2 and less than 4. The electrolyte solution contains a halogenated benzene. The amount of halogenated benzene contained in the electrolyte solution is 1 ppm or more and 500 ppm or less.

9 Claims, 1 Drawing Sheet

(51) Int. Cl.
    *H01M 10/0525*     (2010.01)
    *H01M 10/0567*     (2010.01)
    *H01M 10/0568*     (2010.01)

(52) U.S. Cl.
    CPC .. *H01M 10/0568* (2013.01); *H01M 2004/027* (2013.01); *H01M 2300/0025* (2013.01)

(56) References Cited

U.S. PATENT DOCUMENTS

| | | |
|---|---|---|
| 2017/0346066 A1 | 11/2017 | Sunano et al. |
| 2019/0319261 A1 | 10/2019 | Uchiyama et al. |
| 2020/0091500 A1 | 3/2020 | Nishitani et al. |

FOREIGN PATENT DOCUMENTS

| | | |
|---|---|---|
| JP | 2011-159496 A | 8/2011 |
| JP | 2013-251097 A | 12/2013 |
| KR | 2003 0052981 A | 6/2003 |
| WO | 2016/035290 A1 | 3/2016 |
| WO | 2017/104414 A1 | 6/2017 |
| WO | 2018/101072 A1 | 6/2018 |
| WO | 2018/123751 A1 | 7/2018 |

OTHER PUBLICATIONS

The Extended European Search Report dated Nov. 15, 2021, issued in counterpart to EP Application No. 19827341.9. (9 pages).
Office Action dated Mar. 14, 2024, issued in counterpart CN Application No. 201980040729.2, with partial English translation. (10 pages).

\* cited by examiner

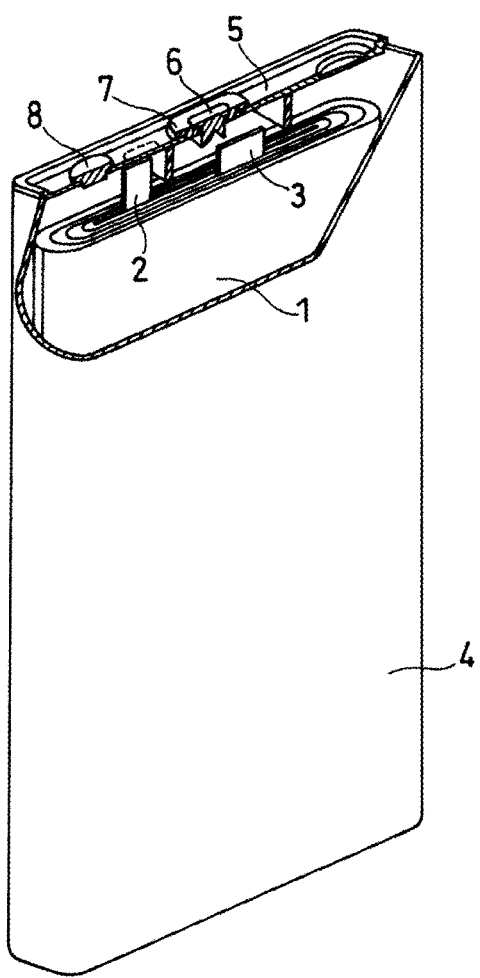

NON-AQUEOUS ELECTROLYTE SECONDARY BATTERY

TECHNICAL FIELD

The present invention relates to a non-aqueous electrolyte secondary battery that includes a negative electrode active material that contains a lithium silicate phase in which silicon particles are dispersed.

BACKGROUND ART

In recent years, non-aqueous electrolyte secondary batteries, in particular, lithium ion secondary batteries are expected to be used for small consumer applications and also to be used as power storage apparatuses and power sources for electric vehicles because they have a high voltage and a high energy density. Under the circumstances where demand is increasing for batteries with a higher energy density, a material containing silicon that can be alloyed with lithium is expected to be used as a negative electrode active material that has a high theoretical capacity density.

$SiO_x$ has a larger amount of absorption of lithium ions per unit volume than graphite, but it causes a large irreversible capacity loss during charge and discharge. In a non-aqueous electrolyte secondary battery in which SiO (where x=1) is used, the initial charge/discharge efficiency may be as low as, for example, about 70%.

$SiO_x$ contains a $SiO_2$ matrix and fine Si particles that are dispersed in the matrix. During charge, a reaction represented by the following formula (i) takes place in the Si particles, and a reaction represented by the following formula (ii) takes place in the $SiO_2$ matrix.

$$Si+4Li^++4e^- \rightarrow Li_4Si \qquad (i)$$

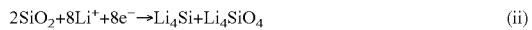

$$2SiO_2+8Li^++8e^- \rightarrow Li_4Si+Li_4SiO_4 \qquad (ii)$$

The reaction represented by the above formula (ii) is an irreversible reaction. That is, lithium ions absorbed in the $SiO_2$ matrix during charge are unlikely to be released during discharge. The generation of $Li_4SiO_4$ is the main factor for the reduction of the initial charge/discharge efficiency.

In contrast, Patent Literature 1 proposes a non-aqueous electrolyte secondary battery that includes, as a negative electrode active material, a composite material that contains a lithium silicate phase represented by $Li_{2z}SiO_{2+z}$ (where 0<z<2) and silicon particles that are dispersed in the lithium silicate phase. The composite material causes a smaller irreversible capacity loss than $SiO_x$, and thus the initial charge/discharge efficiency is improved.

CITATION LIST

Patent Literature

[PTL 1] WO 2016/035290

SUMMARY OF INVENTION

Technical Problem

Along with further improvement in the performance of electronic devices and the like, demand is increasing for further improvement in the charge/discharge efficiency (achieving a high capacity) of a non-aqueous electrolyte secondary battery that contains the above-described composite material, which is expected to be used as a power source for the electronic devices.

Solution to Problem

In view of the above, an aspect of the present invention relates to a non-aqueous electrolyte secondary battery including: a positive electrode; a negative electrode; and an electrolyte solution, wherein the negative electrode contains a negative electrode active material that is capable of electrochemically absorbing and desorbing lithium, the negative electrode active material contains a lithium silicate phase and silicon particles that are dispersed in the lithium silicate phase, the lithium silicate phase is an oxide phase that contains lithium, silicon, and oxygen, an atomic ratio O/Si of oxygen relative to silicon in the lithium silicate phase is greater than 2 and less than 4, the electrolyte solution contains a halogenated benzene, and the amount of the halogenated benzene contained in the electrolyte solution is 1 ppm or more and 500 ppm or less.

Advantageous Effects of Invention

According to the present invention, it is possible to enhance the initial charge/discharge efficiency of the non-aqueous electrolyte secondary battery.

Novel features of the present invention are set forth in the appended claims. However, the configuration and details of the present invention, as well as other objects and features of the present invention, will be further understood with reference to the following detailed description and the accompanying drawings.

BRIEF DESCRIPTION OF DRAWING

FIG. 1 is a schematic partial cutaway perspective view of a non-aqueous electrolyte secondary battery according to an embodiment of the present invention.

DESCRIPTION OF EMBODIMENT

A non-aqueous electrolyte secondary battery according to an embodiment of the present invention includes a positive electrode, a negative electrode, and an electrolyte solution. The negative electrode contains a negative electrode active material capable of electrochemically absorbing and desorbing lithium. As the negative electrode active material, a negative electrode material (hereinafter also referred to as "negative electrode material LSX" or simply as "LSX") that contains a lithium silicate phase and silicon particles that are dispersed in the lithium silicate phase is used. The lithium silicate phase is an oxide phase that contains lithium (Li), silicon (Si), and oxygen (O). The ratio O/Si of O relative to Si in the lithium silicate phase is greater than 2 and less than 4. The electrolyte solution contains a halogenated benzene. The amount of the halogenated benzene contained in the electrolyte solution is 1 ppm or more and 500 ppm or less in terms of mass ratio.

It is advantageous that the ratio O/Si is greater than 2 and less than 4 (in the formula given later, z satisfies 0<z<2) in terms of stability and lithium ion conductivity. The atomic ratio Li/Si of Li relative to Si in the lithium silicate phase may be, for example, greater than 0 and less than 4. The lithium silicate phase may contain a trace amount of components other than Li, Si, and O, such as iron (Fe), chromium (Cr), nickel (Ni), manganese (Mn), copper (Cu), molybdenum (Mo), zinc (Zn), and aluminum (Al).

The lithium silicate phase may have a composition represented by $Li_{2z}SiO_{2+z}$ (where $0<z<2$).

For example, when the lithium silicate phase of the LSX has a composition: $Li_2Si_2O_5$ (where $z=\frac{1}{2}$), a reaction represented by the following formula (1) proceeds in the silicon particles during charge, and a reaction represented by the following formula (2) proceeds in a portion of the lithium silicate phase. The reaction represented by the formula (2) is an irreversible reaction.

$$Si+4Li^++4e^-\rightarrow Li_4Si \quad (1)$$

$$0.8Li_2Si_2O_5+4.8Li^++4.8e^-\rightarrow 0.6Li_4Si+Li_4SiO_4 \quad (2)$$

The LSX consumes a less amount of lithium to generate $Li_4SiO_4$ as compared with $SiO_x$, and causes a small irreversible capacity loss. When a halogenated benzene is contained in the electrolyte solution of the non-aqueous electrolyte secondary battery in which the LSX as described above is used, a coating film derived from the halogenated benzene is moderately formed on the LSX surface mainly during initial charge. As a result of the LSX surface being moderately covered by the coating film, the irreversible reaction represented by the formula (2) (generation of $Li_4SiO_4$) is suppressed, and the reaction represented by the formula (1) given above proceeds efficiently. That is, with the addition of a halogenated benzene, the amount of lithium consumed in the irreversible reaction is reduced. Accordingly, the initial charge/discharge efficiency of the non-aqueous electrolyte secondary battery that contains the LSX is improved. The coating film is a moderately sparse film, and thus it is considered that the coating film has a small reaction resistance and good lithium ion conductivity.

However, when the amount of halogenated benzene contained in the electrolyte solution is less than 1 ppm, the effect produced by adding a halogenated benzene is small. Accordingly, it is difficult to suppress the irreversible capacity loss of the negative electrode, and the effect of improving the initial charge/discharge efficiency cannot be obtained.

On the other hand, when the amount of the halogenated benzene contained in the electrolyte solution is greater than 500 ppm, the coating film is excessively formed on the LSX surface, and thus the reaction resistance of the coating film increases. Accordingly, not only the reaction represented by the formula (2), but also the reaction represented by the formula (1) is suppressed, as a result of which, the initial charge/discharge efficiency and the initial capacity decrease.

From the viewpoint of improving the initial charge/discharge efficiency, the amount of the halogenated benzene contained in the electrolyte solution is preferably 1 ppm or more and 400 ppm or less.

A halogenated benzene is a compound in which at least one halogen atom is bonded to a benzene ring. The type of halogen atom bonded to a benzene ring is not particularly limited, but, from the viewpoint of easily forming a moderately sparse coating film, the halogen atom is preferably at least one of a fluorine atom and a chlorine atom.

In the case where a plurality of halogen atoms are bonded to a benzene ring, the relative positional relationship between the plurality of halogen atoms is not particularly limited. Irrespective of the relative positional relationship between halogen atoms bonded to a benzene ring, as long as a halogen atom is bonded to a benzene ring, a moderately sparse coating film can be formed, and the effect of improving the charge/discharge efficiency can be obtained. Also, the plurality of halogen atoms bonded to a benzene ring may be of the same type or different types.

A specific example of the halogenated benzene may be, for example, at least one selected from the group consisting of chlorobenzene, dichlorobenzene, fluorobenzene, difluorobenzene, and hexafluorobenzene. Among these, the halogenated benzene is preferably chlorobenzene. The dichlorobenzene may be any of 1,2-dichlorobenzene, 1,3-dichlorobenzene, and 1,4-dichlorobenzene, and the difluorobenzene may be any of 1,2-difluorobenzene, 1,3-difluorobenzene, and 1,4-difluorobenzene.

The amount of the halogenated benzene contained in the electrolyte solution in the battery is determined by using gas chromatography mass spectrometry (GCMS).

The electrolyte solution contains a non-aqueous solvent, a lithium salt dissolved in the non-aqueous solvent, and a specific amount of a halogenated benzene as an additive.

The lithium salt preferably contains at least one of LiN$(SO_2F)_2$ (hereinafter referred to as LFSI) and $LiPF_6$ because they have a wide potential window and high electric conductivity. $LiPF_6$ can moderately form a passivation film on a positive electrode current collector or the like, and thus corrosion of the positive electrode current collector or the like can be suppressed, and the reliability of the battery can be improved. LFSI is likely to form a good coating film (SEI: Solid Electrolyte Interface) on the LSX surface.

The LFSI concentration in the electrolyte solution is preferably 0.1 mol/L or more and 1.0 mol/L or less. The $LiPF_6$ concentration in the electrolyte solution is preferably 0.5 mol/L or more and 1.5 mol/L or less. The total concentration of LFSI and $LiPF_6$ in the electrolyte solution is preferably 1 mol/L or more and 2 mol/L or less. When LFSI and $LiPF_6$ are used in combination at a concentration within the concentration range described above, the effects obtained by using LFSI and $LiPF_6$ can be obtained with a good balance, and the initial charge/discharge efficiency of the battery can be further enhanced.

[Negative Electrode Material LSX]

The lithium silicate phase described above may have a composition represented by $Li_{2z}SiO_{2+z}$ (where $0<z<2$). As z takes a smaller value, the number of sites in the lithium silicate phase that can absorb lithium increases. Accordingly, the effect of suppressing the absorption of lithium in the lithium silicate phase, which is produced by the halogenated benzene, can be obtained remarkably. From the viewpoint of stability, ease of production, lithium ion conductivity, and the like, z preferably satisfies $0<z<1$, and more preferably $z=\frac{1}{2}$.

In the lithium silicate phase, the number of sites that are reactive with lithium is smaller than that in the $SiO_2$ matrix contained in $SiO_x$. Accordingly, the LSX is unlikely to cause an irreversible capacity loss during charge and discharge, as compared with $SiO_x$. By dispersing silicon particles in the lithium silicate phase, excellent charge/discharge efficiency can be obtained in the initial stage of charge and discharge. Also, the amount of silicon particles can be changed as desired, and it is therefore possible to design a high capacity negative electrode.

The silicon particles dispersed in the lithium silicate phase have a crystallite size of, for example, 10 nm or more. The silicon particles have a particulate phase of silicon (Si) simple substance. When the silicon particles have a crystallite size of 10 nm or more, the surface area of the silicon particles can be reduced, and thus degradation of the silicon particles that causes the occurrence of irreversible capacity loss is unlikely to occur. The crystallite size of the silicon particles is calculated from the half-width of a diffraction peak attributed to the Si (111) plane in an X-ray diffraction (XRD) pattern of the silicon particles by using the Scherrer's equation.

The negative electrode material LSX also has excellent structural stability. This is because silicon particles are dispersed in the lithium silicate phase, and thus expansion and contraction of the negative electrode material LSX during charge and discharge can be suppressed. From the viewpoint of suppressing cracking of silicon particles, the silicon particles before initial charging is performed have an average particle size of preferably 500 nm or less, more preferably 200 nm or less, and even more preferably 50 nm or less. The silicon particles after initial charging is performed have an average particle size of preferably 400 nm or less, and more preferably 100 nm or less. By pulverizing the silicon particles into fine particles, the volume change during charge and discharge is reduced, and the structural stability of the negative electrode material LSX is further improved.

The average particle size of the silicon particles is measured by observing an SEM (scanning electron microscope) image of a cross section of the negative electrode material LSX. Specifically, the average particle size of the silicon particles is determined by averaging the largest diameters of arbitrarily selected 100 silicon particles. A silicon particle is formed by an aggregation of a plurality of crystallites.

The amount of silicon particles contained in the negative electrode material LSX may be, from the viewpoint of achieving a high capacity, for example, 30 mass % or more, and is preferably 35 mass % or more, and more preferably 55 mass % or more. In this case, good lithium ion diffusibility can be obtained, and thus excellent load characteristics are easily obtained. On the other hand, from the viewpoint of improving cycle characteristics, the amount of silicon particles contained in the negative electrode material LSX is preferably 95 mass % or less, and more preferably 75 mass % or less. This is because the surface of the silicon particles that is exposed without being covered with the lithium silicate phase is reduced, and the reaction between the electrolyte solution and the silicon particles is easily suppressed.

The amount of silicon particles can be measured using Si-NMR. Desirable Si-NMR measurement conditions are given below.

Measurement apparatus: solid-state nuclear magnetic resonance spectrometer (INOVA-400) available from Varian
Probe: Varian 7 mm CPMAS-2
MAS: 4.2 kHz
MAS rate: 4 kHz
Pulse: DD (45° pulse +signal acquisition time 1H decoupling)
Repetition time interval: 1200 sec
Observed frequency range: 100 kHz
Observed center: around −100 ppm
Signal acquisition time: 0.05 sec
Number of accumulations: 560
Sample amount: 207.6 mg The composition of the lithium silicate phase $Li_{2z}SiO_{2+z}$ can be analyzed by using the method described below.

First, the mass of a sample of the negative electrode material LSX is measured. After that, the amounts of carbon, lithium and oxygen contained in the sample are calculated in the following manner. Next, the amount of carbon is subtracted from the mass of the sample, the amounts of lithium and oxygen in the remaining amount of the sample are calculated, and the ratio between 2z and (2+z) is determined from the molar ratio of lithium (Li) relative to oxygen (O).

The amount of carbon is measured by using a carbon.sulfur analysis apparatus (for example, EMIA-520 available from HORIBA, Ltd.). A sample is measured and placed on a magnetic board, and a combustion improving agent is added thereto. The magnetic board is placed in a combustion furnace (carrier gas: oxygen) heated to 1350° C., and the amount of carbon dioxide gas generated during combustion is detected by infrared absorption. A calibration curve is created by using, for example, carbon steel (the amount of carbon being 0.49%) available from Bureau of Analysed Samples. Ltd., and the amount of carbon contained in the sample is calculated (high-frequency induction heating furnace combustion-infrared absorption method).

The amount of oxygen is measured by using an oxygen-.nitrogen.hydrogen analysis apparatus (for example, EGMA-830 available from HORIBA, Ltd.). A sample is encapsulated into Ni capsules, and the Ni capsules are loaded into a carbon crucible heated by a power of 5.75 kW together with Sn pellets and Ni pellets that serve as flux, and carbon monoxide gas emitted therefrom is detected. A calibration curve is created by using a standard sample $Y_2O_3$, and the amount of oxygen contained in the sample is calculated (inert gas fusion-non-dispersive infrared absorption method).

The amount of lithium is measured by completely dissolving a sample in heated nitrohydrofluoric acid (a heated mixture of hydrofluoric acid and nitric acid), filtering and removing carbon remaining in the dissolved sample, and then analyzing the obtained filtrate based on inductively coupled plasma-atomic emission spectroscopy (ICP-AES). A calibration curve is created by using a commercially available lithium standard solution, and the amount of lithium contained in the sample is calculated.

The amount of silicon is obtained by subtracting the amount of carbon, the amount of oxygen, and the amount of lithium from the mass of the sample of the negative electrode material LSX. The amount of silicon includes both the amount of silicon that is present in the form of silicon particles and the amount of silicon that is present in the form of a lithium silicate. The amount of silicon particles is obtained based on Si-NMR measurement, and the amount of silicon that is present in the form of a lithium silicate in the negative electrode material LSX is obtained.

The negative electrode material LSX is preferably a particulate material (hereinafter also referred to as "LSX particles") with an average particle size of preferably 1 to 25 µm, and more preferably 4 to 15 µm. When the particle size is within the above-described range, a stress caused by a volume change in the negative electrode material LSX during charge and discharge is more easily relaxed, and good cycle characteristics are easily obtained. Also, the LSX particles have an appropriate surface area, and thus a capacity reduction caused by a side reaction with the non-aqueous electrolyte is also suppressed.

As used herein, the average particle size of the LSX particles refers to the particle size (volume average particle size) at 50% of the volume cumulative value in a particle size distribution obtained by a laser diffraction scattering method. As the measurement apparatus, for example, LA-750 available from HORIBA, Ltd. can be used.

The LSX particles each preferably include a conductive material that covers at least a portion of the surface of the LSX particle. The lithium silicate phase has poor electron conductivity, and thus the conductivity of the LSX particles tends to be low. By covering the surface of the LSX particles with a conductive material, the conductivity can be increased significantly. The conductive layer is preferably as thin as not to substantially affect the average particle size of the LSX particles.

Next, a non-aqueous electrolyte secondary battery according to an embodiment of the present invention will be described in detail. The non-aqueous electrolyte secondary battery includes, for example, a negative electrode, a positive electrode, and a non-aqueous electrolyte as described below.

[Negative Electrode]

The negative electrode includes, for example, a negative electrode current collector and a negative electrode material mixture layer that is formed on the surface of the negative electrode current collector and contains a negative electrode active material. The negative electrode material mixture layer can be formed by applying a negative electrode slurry obtained by dispersing a negative electrode material mixture in a dispersion medium to the surface of the negative electrode current collector and drying the negative electrode slurry. The dried coating film may be rolled where necessary. The negative electrode material mixture layer may be formed on one or both surfaces of the negative electrode current collector.

The negative electrode material mixture contains, as an essential component, a negative electrode material LSX (or LSX particles) that serves as a negative electrode active material, and may contain optional components such as a binder, a conductive material and a thickener. The silicon particles contained in the negative electrode material LSX can absorb many lithium ions, and thus contribute to achieving a high capacity negative electrode.

It is preferable that the negative electrode active material further contains a carbon material that electrochemically absorbs and desorbs lithium ions. The negative electrode material LSX expands and contracts in volume during charge and discharge. If the proportion of the negative electrode material LSX in the negative electrode active material is large, a contact failure is likely to occur between the negative electrode active material and the negative electrode current collector during charge and discharge. However, by using the negative electrode material LSX in combination with the carbon material, excellent cycle characteristics can be achieved while imparting a high capacity of the silicon particles to the negative electrode. The proportion of the negative electrode material LSX in the total amount of the negative electrode material LSX and the carbon material is, for example, preferably 3 to 30 mass %. With this configuration, both a high capacity and an improvement in the cycle characteristics are easily achieved.

Examples of the carbon material include a graphite, a graphitizable carbon (soft carbon), a non-graphitizable carbon (hard carbon), and the like. Among them, it is preferable to use a graphite that has excellent stability during charge and discharge and also causes a less irreversible capacity loss. As used herein, the graphite refers to a material that has a graphite crystalline structure. Examples of the graphite include a natural graphite, an artificial graphite, graphitized mesophase carbon particles, and the like. The carbon materials may be used alone or in a combination of two or more.

As the negative electrode current collector, a nonporous conductive substrate (a metal foil or the like) or a porous conductive substrate (a mesh, a net, a punched sheet or the like) is used. Examples of materials for forming the negative electrode current collector include stainless steel, nickel, nickel alloys, copper, copper alloys, and the like. The thickness of the negative electrode current collector is not particularly limited, but from the viewpoint of a balance between the strength of the negative electrode and a reduction in weight, the thickness of the negative electrode current collector is preferably 1 to 50 µm, and more preferably 5 to 20 µm.

Examples of the binder include resin materials, for example, fluorocarbon resins such as polytetrafluoroethylene and polyvinylidene fluoride (PVDF); polyolefin resins such as polyethylene and polypropylene; polyamide resins such as aramid resin; polyimide resins such as polyimide and polyamide imide; acrylic resins such as polyacrylic acid, polymethyl acrylate and ethylene-acrylic acid copolymers; vinyl resins such as polyacrylonitrile and polyvinyl acetate; polyvinyl pyrrolidone; polyether sulfone; rubber-like materials such as styrene-butadiene copolymer rubber (SBR); and the like. They may be used alone or in a combination of two or more.

Examples of the conductive material include: carbons such as acetylene black and carbon nanotubes; conductive fibers such as carbon fibers and metal fibers; carbon fluoride; metal powders such as aluminum powders; conductive whiskers such as zinc oxide and potassium titanate; conductive metal oxides such as titanium oxide; organic conductive materials such as phenylene derivatives; and the like. They may be used alone or in a combination of two or more.

Examples of the thickener include carboxymethyl cellulose (CMC), modified variants thereof (including salts such as a Na salt), cellulose derivatives (cellulose ether and the like) such as methyl cellulose; saponified polymers having a vinyl acetate unit such as polyvinyl alcohol; polyethers (polyalkylene oxides such as polyethylene oxide); and the like. They may be used alone or in a combination of two or more.

The dispersion medium is not particularly limited, but examples include water, alcohols such as ethanol, ethers such as tetrahydrofuran, amides such as dimethyl formamide, N-methyl-2-pyrrolidone (NMP), mixed solvents thereof, and the like.

[Positive Electrode]

The positive electrode includes, for example, a positive electrode current collector and a positive electrode material mixture layer that is formed on the surface of the positive electrode current collector. The positive electrode material mixture layer can be formed by applying a positive electrode slurry obtained by dispersing a positive electrode material mixture in a dispersion medium to the surface of the positive electrode current collector and drying the positive electrode slurry. The dried coating film may be rolled where necessary. The positive electrode material mixture layer may be formed on one or both surfaces of the positive electrode current collector.

As the positive electrode active material, a lithium composite metal oxide can be used. Examples include $Li_aCoO_2$, $Li_aNiO_2$, $Li_aMnO_2$, $Li_aCo_bNi_{1-b}O_2$, $Li_aCo_bM_{1-b}O_c$, $Li_aNi_{1-b}M_bO_c$, $Li_aMn_2O_4$, $Li_aMn_{2-b}M_bO_4$, $LiMPO_4$, and $Li_2MPO_4F$ (where M represents at least one of Na, Mg, Sc, Y, Mn, Fe, Co, Ni, Cu, Zn, Al, Cr, Pb, Sb, and B). Here, a=0 to 1.2, b=0 to 0.9, and c=2.0 to 2.3. The value of a that indicates the molar ratio of lithium corresponds to the value immediately after the active material is produced, and varies during charge and discharge.

Among these, it is preferable to use a lithium nickel composite oxide represented by $Li_aNi_bM_{1-b}O_2$ (where M represents at least one selected from the group consisting of Mn, Co, and Al, 0<a≤1.2, and 0.3≤b≤1). From the viewpoint of achieving a high capacity, it is more preferable to satisfy 0.85≤b≤1. From the viewpoint of stability of the crystal structure, it is even more preferable to use $Li_aN_{1b}Co_cAl_dO_2$ in which Co and Al are contained as M (where $0<a\leq1.2$, $0.85\leq b<1$, $0<c<0.15$, $0<d\leq0.1$, and $b+c+d=1$).

As the binder and the conductive material, the same materials as listed in the description for the negative electrode can be used. As the conductive material, a graphite such as a natural graphite or an artificial graphite may be used.

The shape and the thickness of the positive electrode current collector can be selected from the shapes and the thickness range of the negative electrode current collector. Examples of materials for forming the positive electrode current collector include stainless steel, aluminum, aluminum alloys, titanium, and the like.

[Electrolyte Solution]

The electrolyte solution contains a non-aqueous solvent, a lithium salt dissolved in the non-aqueous solvent, and a specific amount of a halogenated benzene as an additive.

The lithium salt concentration in the electrolyte solution is preferably, for example, 0.5 mol/L or more and 2 mol/L or less. By controlling the lithium salt concentration to be within the above-described range, an electrolyte solution that has excellent ion conductivity and an appropriate viscosity can be obtained. However, the lithium salt concentration is not limited to the above-described range.

As the non-aqueous solvent, for example, a cyclic carbonic ester (excluding an unsaturated cyclic carbonic ester, which will be described later), a linear carbonic ester, a cyclic carboxylic acid ester, a linear carboxylic acid ester, and the like may be used. Examples of the cyclic carbonic ester include propylene carbonate (PC), ethylene carbonate (EC), and the like. Examples of the linear carbonic ester include diethyl carbonate (DEC), ethyl methyl carbonate (EMC), dimethyl carbonate (DMC), and the like. Examples of the cyclic carboxylic acid ester include γ-butyrolactone (GBL), γ-valerolactone (GVL), and the like. Examples of the linear carboxylic acid ester include methyl formate, ethyl formate, propyl formate, methyl acetate, ethyl acetate, propyl acetate, methyl propionate, ethyl propionate, propyl propionate, and the like. The non-aqueous solvents may be used alone or in a combination of two or more.

As the lithium salt, a known lithium salt can be used. Preferred examples of the lithium salt include: $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lithium lower aliphatic carboxylate, LiCl, LiBr, LiI, borates, imides, and the like. Examples of the borates include lithium bis(1,2-benzenediolate(2-)-O,O')borate, lithium bis(2,3-naphthalenediolate (2-)-O,O')borate, lithium bis(2,2'-biphenyldiolate(2-)-O,O') botrate, lithium bis(5-fluoro-2-olate-1-benzene sulfonate-O, O')borate, and the like. Examples of the imides include LFSI, lithium bis(trifluoromethyl sulfonyl)imide (LiN$(CF_3SO_2)_2$), lithium trifluoromethyl sulfonyl nonafluorobutyl sulfonyl imide (LiN($CF_3SO_2$)($C_4F_9SO_2$)), lithium bis(pentafluoroethyl sulfonyl)imide (LiN($C_2F_5SO_2$)$_2$), and the like. Among these, it is preferable to use at least one of $LiPF_6$ and LFSI. These lithium salts may be used alone or in a combination of two or more.

The electrolyte solution may further contain an additive other than the halogenated benzene. As the additive other than the halogenated benzene, a cyclic carbonic ester (hereinafter also referred to as "unsaturated cyclic carbonic ester") that has at least one carbon-carbon unsaturated bond within a molecule may be used. As a result of the unsaturated cyclic carbonic ester being decomposed on the negative electrode, a coating film that has high lithium ion conductivity is formed on the surface of the negative electrode, and the charge/discharge efficiency is further enhanced.

As the unsaturated cyclic carbonic ester, a known compound can be used. Preferred examples of the unsaturated cyclic carbonic ester include vinylene carbonate, 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinylethylene carbonate, divinylethylene carbonate, and the like. Among these, it is preferable to use at least one selected from the group consisting of vinylene carbonate, vinylethylene carbonate, and divinylethylene carbonate. The unsaturated cyclic carbonic esters may be used alone or in a combination of two or more. In the unsaturated cyclic carbonic ester, some of the hydrogen atoms may be substituted by fluorine atoms.

[Separator]

Normally, it is desirable that a separator is interposed between the positive electrode and the negative electrode. The separator has high ion permeability, as well as an appropriate mechanical strength and insulation. As the separator, a micro-porous thin film, a woven fabric, a non-woven fabric or the like may be used. As the material for forming the separator, it is preferable to use a polyolefin such as polypropylene or polyethylene.

The non-aqueous electrolyte secondary battery has, for example, a structure in which an electrode group and the non-aqueous electrolyte are housed in an outer casing, the electrode group being formed by spirally winding the positive electrode and the negative electrode with the separator interposed therebetween. Alternatively, instead of the spirally-wound electrode group, other types of electrode groups may be used such as a stacked electrode group in which the positive electrode and the negative electrode are stacked with the separator interposed therebetween. The non-aqueous electrolyte secondary battery may have any shape such as, for example, a cylindrical shape, a prismatic shape, a coin shape, a button shape, or a laminate shape.

FIG. 1 is a schematic partial cutaway perspective view of a prismatic non-aqueous electrolyte secondary battery according to an embodiment of the present invention.

The battery includes a bottomed prismatic battery case 4, and an electrode group 1 and a non-aqueous electrolyte (not shown) that are housed in the battery case 4. The electrode group 1 includes an elongated strip-shaped negative electrode, an elongated strip-shaped positive electrode, and a separator that is interposed between the negative electrode and the positive electrode to prevent them from coming into direct contact with each other. The electrode group 1 is formed by spirally winding the negative electrode, the positive electrode and the separator around a flat plate-shaped winding core, and then removing the winding core.

One end of a negative electrode lead 3 is attached to a negative electrode current collector of the negative electrode by welding or the like. The other end of the negative electrode lead 3 is electrically connected to a negative electrode terminal 6 provided to a sealing plate 5 via a resin insulating plate (not shown). The negative electrode terminal 6 is insulated from the sealing plate 5 by a resin gasket 7. One end of a positive electrode lead 2 is attached to a positive electrode current collector of the positive electrode by welding or the like. The other end of the positive electrode lead 2 is connected to the underside of the sealing plate 5 via the insulating plate. That is, the positive electrode lead 2 is electrically connected to the battery case 4 that also serves as a positive electrode terminal. The insulating plate functions to separate the electrode group 1 and the sealing plate 5 and to separate the negative electrode lead 3 and the battery case 4. The peripheral edge of the sealing plate 5 is fitted to an opening end portion of the battery case 4, and the fitted portion is laser welded. In this way, the opening portion of the battery case 4 is sealed with the sealing plate 5. A non-aqueous electrolyte injection hole formed in the sealing plate 5 is closed by a closure 8.

Hereinafter, the present invention will be described specifically by way of examples and comparative examples. However, the present invention is not limited to the examples given below.

EXAMPLE 1

[Preparation of Negative Electrode Material LSX]

A lithium silicate represented by the formula: $Li_2Si_2O_5$ (where z=0.5) was obtained by mixing silicon dioxide and lithium carbonate at an atomic ratio Si/Li of 1.05, and baking the mixture in the air at 950° C. for 10 hours. The obtained lithium silicate was pulverized into particles with an average particle size of 10

The lithium silicate ($Li_2Si_2O_5$) particles with an average particle size of 10 μm and raw material silicon (3N, with an average particle size of 10 μm) were mixed at a mass ratio of 45:55. The mixture was poured into a pot (made of SUS, with a volume of 500 mL) of a planetary ball mill (P-5 available from Fritsch, Co., Ltd.), 24 SUS balls (with a diameter of 20 mm) were placed in the pot, and then the pot was closed. The mixture was pulverized at 200 rpm in an inert atmosphere for 50 hours.

Next, the mixture in the form of powder was taken out from the pot in the inert atmosphere, and then baked at 800° C. for 4 hours while applying pressure by using a hot press machine. In this way, a sintered body of the mixture (negative electrode material LSX) was obtained.

After that, the negative electrode material LSX was pulverized and sieved through a 40 μm mesh, and then the obtained LSX particles were mixed with coal pitch (MCP 250 available from JFE Chemical Corporation). The mixture was baked in an inert atmosphere at 800° C. to cover the surface of each LSX particle with conductive carbon and form a conductive layer. The amount of conductive layer covering the LSX particle was 5 mass % relative to the total mass of the LSX particle and the conductive layer. After that, LSX particles with an average particle size of 5 μm and a conductive layer were obtained by using a sieve.

The LSX particles were subjected to XRD analysis, and it was found that the crystallite size of silicon particles calculated from the diffraction peaks attributed to the Si (111) plane by using the Scherrer's equation was 15 nm.

Also, the composition of the lithium silicate phase was analyzed by using the above-described methods (the high-frequency induction heating furnace combustion-infrared absorption method, the inert gas fusion-non-dispersive infrared absorption method, and the inductively coupled plasma-atomic emission spectroscopy (ICP-AES)), and it was found that the Si/Li ratio was 1.0, and the amount of $Li_2Si_2O_5$ measured by Si-NMR was 45 mass % (the amount of silicon particles was 55 mass %).

[Production of Negative Electrode]

LSX particles having a conductive layer and a graphite were mixed, and the resulting mixture was used as a negative electrode active material. The proportion of graphite relative to the total amount of the LSX particles having a conductive layer and the graphite was 94 mass %. Then, a negative electrode slurry was prepared by mixing the negative electrode active material with sodium carboxymethyl cellulose (CMC-Na) and styrene-butadiene rubber (SBR) at a mass ratio of 97.5:1:1.5, adding water to the mixture, and thereafter stirring the mixture by using a mixer (TK HIVIS MIX available from PRIMIX Corporation).

Next, the negative electrode slurry was applied to each surface of a copper foil such that the mass of the negative electrode material mixture per $m^2$ was 190 g, and the coating film was dried and rolled. A negative electrode in which a negative electrode material mixture layer having a density of 1.5 g/cm$^3$ was formed on each surface of the copper foil was thereby produced.

[Production of Positive Electrode]

A positive electrode slurry was prepared by mixing a lithium nickel composite oxide ($LiNi_{0.8}Co_{0.18}Al_{0.02}O_2$), acetylene black, and polyvinylidene fluoride at a mass ratio of 95:2.5:2.5, adding N-methyl-2-pyrolidone (NMP), and then stirring the mixture by using a mixer (T.K. HIVIS MIX available from PRIMIX Corporation). Next, the positive electrode slurry was applied to each surface of an aluminum foil, and the coating film was dried and rolled. A positive electrode in which a positive electrode material mixture layer having a density of 3.6 g/cm$^3$ was formed on each surface of the aluminum foil was thereby produced.

[Preparation of Electrolyte Solution]

An electrolyte solution was prepared by dissolving a lithium salt in a non-aqueous solvent. As the non-aqueous solvent, a solvent mixture containing ethylene carbonate (EC), dimethyl carbonate (DMC), and methyl acetate (MA) at a volume ratio of 20:40:40 was used. In the electrolyte solution, 500 ppm of fluorobenzene as a halogenated benzene was contained (added amount when preparing). As the lithium salt, $LiPF_6$ was used. The $LiPF_6$ concentration in the electrolyte solution was 1.2 mol/L.

[Production of Non-Aqueous Electrolyte Secondary Battery]

An electrode group was produced by attaching a tab to each of the positive electrode and the negative electrode and spirally winding the positive electrode and the negative electrode with a separator interposed therebetween such that the tabs were positioned at the outermost circumferential portion. The electrode group was inserted into an outer casing made of an aluminum laminate film and then vacuum dried at 105° C. for 2 hours. Then, the electrolyte solution was injected, and the opening portion of the outer casing was sealed. A battery A1 was thereby obtained.

EXAMPLES 2 TO 4

Batteries A2 to A4 were produced in the same manner as in Example 1, except that, when preparing electrolyte solutions, the compounds shown in Table 1 were used as the halogenated benzenes, and the amount of the halogenated benzene in each electrolyte solution was set to the values shown in Table 1 (added amount when preparing). As the lithium salt, either $LiPF_6$ alone or a combination of LFSI and $LiPF_6$ was used. The $LiPF_6$ concentration in each electrolyte solution and the LFSI concentration in each electrolyte solution were set to the values shown in Table 1.

Comparative Example 1

A battery B1 was produced in the same manner as in Example 1, except that, when preparing an electrolyte solution, a halogenated benzene was not contained in the electrolyte solution.

Comparative Examples 2 to 4

Batteries B2 to B4 were produced in the same manner as in Example 1, except that, when preparing electrolyte solutions, the compounds shown in Table 1 were used as the halogenated benzenes, and the amount of the halogenated benzene in each electrolyte solution was set to the values shown in Table 1 (added amount when preparing). As the lithium salt, $LiPF_6$ and LFSI were used. The $LiPF_6$ concentration in each electrolyte solution and the LFSI concentration in each electrolyte solution were set to the values shown in Table 1.

Comparative Example 5

A battery B5 was produced in the same manner as in Example 1, except that, when producing a negative electrode, only graphite was used in the negative electrode active material, and when preparing an electrolyte solution, a halogenated benzene was not contained in the electrolyte solution.

Comparative Example 6

A battery B6 was produced in the same manner as in Example 1, except that, when producing a negative electrode, only graphite was used in the negative electrode active material, and when preparing an electrolyte solution, the compound shown in Table 1 was used as the halogenated benzene, and the amount of the halogenated benzene contained in the electrolyte solution was set to the value shown in Table 1 (added amount when preparing). As the lithium salt, $LiPF_6$ and LFSI were used. The $LiPF_6$ concentration in the electrolyte solution and the LFSI concentration in the electrolyte solution were set to the values shown in Table 1.

Each of the batteries produced above was evaluated in the following manner.

[Evaluation 1: Initial Charge/Discharge Efficiency and Initial Capacity]

Each of the produced batteries was subjected to constant current charge in an environment at 25° C. at a current of 0.3 It until the voltage reached 4.2 V, and then subjected to constant voltage charge at a constant voltage of 4.2 V until the current reached 0.015 It. After that, the battery was subjected to constant current discharge at a current of 0.3 It until the voltage reached 2.75 V. (1/X) It represents electric current, (1/X) It (A)=rated capacity (Ah)/X (h), and X represents the time required to charge or discharge electricity that corresponds to the rated capacity. For example, 0.5 It means X=2, and the current value is equal to a rated capacity (Ah)/2(h).

The time interval between charge and discharge was set to 10 minutes. Charge and discharge were performed in an environment at 25° C.

The proportion (percentage) of the discharge capacity relative to the charge capacity at this time was determined as the initial charge/discharge efficiency. Also, the discharge capacity at this time was determined as the initial capacity.

The evaluation results are shown in Table 1.

[Evaluation 2: Analysis of Electrolyte Solution in Battery]

Each battery was subjected to five cycles of charge and discharge under the charge/discharge conditions used in Evaluation 1 above. After that, the battery was removed and disassembled, and the electrolyte solution was analyzed for components by using gas chromatography mass spectrometry (GCMS).

The analysis of the electrolyte solutions was performed under the following GCMS measurement conditions.

Apparatus: GC17A, GCMS-QP5050A available from Shimadzu Corporation

Column: HP-1 (thickness 1.0 μm×length 60 m) available from Agilent Technologies, Ltd.

Column temperature: 50° C.→110° C. (5° C./min, 12 min hold)→250° C. (5° C./min, 7 min hold)→300° C. (10° C./min, 20 min hold)

Split ratio: 1/50

Linear velocity: 29.2 cm/s

Injection port temperature: 270° C.

Injection amount: 0.5 μL

Interface temperature: 230° C.

Mass range: m/z=30 to 400 (SCAN mode), m/z=29, 31, 32, 43, 45, and 60 (SIM mode)

The amount of the halogenated benzene (the mass ratio of the halogenated benzene relative to the entire electrolyte solution) obtained as a result of analysis is shown in Table 1.

[Evaluation 3: Cycle Capacity Retention Rate]

Each battery was subjected to constant current charge at a current of 0.3 It until the voltage reached 4.2 V, and then subjected to constant voltage charge at a constant voltage of 4.2 V until the current reached 0.015 It. After that, the battery was subjected to constant current discharge at a current of 0.3 It until the voltage reached 2.75 V. The time interval between charge and discharge was set to 10 minutes. Charge and discharge were performed in an environment at 25° C.

Charge and discharge were repeated under the charge/discharge conditions described above. The proportion (percentage) of the discharge capacity at the 500th cycle relative to the discharge capacity at the first cycle was determined as the cycle capacity retention rate.

The evaluation results are shown in Table 1.

TABLE 1

| | Negative electrode | | | | Electrolyte solution | | | Evaluation | | |
|---|---|---|---|---|---|---|---|---|---|---|
| | active material | | $LiPF_6$ | LFSI | | Amount of halogenated benzene (added | Amount of halogenated benzene (analytical | Initial charge/ discharge | Initial capacity | Cycle capacity retention |
| Battery No. | Amount of graphite (mass %) | Amount of LSX (mass %) | concen- tration (mol/L) | concen- tration (mol/L) | Type of halogenated benzene | amount when preparing) (ppm) | value) (ppm) | efficiency (%) | (mAh) | rate (%) |
| A1 | 95 | 5 | 1.2 | 0 | Fluorobenzene | 500 | 372 | 87.6 | 3440 | 95 |
| A2 | 95 | 5 | 1.2 | 0 | Hexafluorobenzene | 53 | 21 | 87.2 | 3427 | 94 |
| A3 | 95 | 5 | 1.1 | 0.1 | Chlorobenzene | 10 | 1 | 88.5 | 3478 | 94 |
| A4 | 95 | 5 | 0.6 | 0.6 | 1,2-Dichlorobenzene | 87 | 24 | 88.1 | 3467 | 93 |
| B1 | 95 | 5 | 1.2 | 0 | — | — | — | 86.7 | 3412 | 84 |
| B2 | 95 | 5 | 1.2 | 0 | Hexafluorobenzene | 632 | 503 | 85.3 | 3358 | 73 |

TABLE 1-continued

| | Negative electrode | | LiPF$_6$ | LFSI | | Amount of halogenated benzene (added amount when preparing) (ppm) | Amount of halogenated benzene (analytical value) (ppm) | Evaluation | | |
|---|---|---|---|---|---|---|---|---|---|---|
| | | | | | | | | Initial | Initial | Cycle |
| Battery No. | Amount of graphite (mass %) | Amount of LSX (mass %) | concentration (mol/L) | concentration (mol/L) | Type of halogenated benzene | | | charge/discharge efficiency (%) | capacity (mAh) | capacity retention rate (%) |
| B3 | 95 | 5 | 0.6 | 0.6 | 1,2-Dichlorobenzene | 1000 | 789 | 85.1 | 3340 | 66 |
| B4 | 95 | 5 | 1.1 | 0 | 1,2-Dichlorobenzene | 5 | <0.1 | 85.0 | 3329 | 82 |
| B5 | 100 | 0 | 1.2 | 0 | — | — | — | 91.3 | 3105 | 92 |
| B6 | 100 | 0 | 1.0 | 0.2 | 1,2-Dichlorobenzene | 87 | 76 | 90.4 | 3070 | 88 |

In terms of the amount of the halogenated benzene, the analytical value was smaller than the actually added amount when preparing in Examples 1 to 4 (the batteries A1 to A4) and Comparative Examples 2 to 4 (the batteries B2 to B4). This is considered to be because the halogenated benzene was used to form a coating film on the LSX surface.

In the batteries A1 to A4 in which the amount of the halogenated benzene (analytical value) was 1 ppm or more and 500 ppm or less, the initial charge/discharge efficiency, the initial capacity, and the cycle capacity retention rate increased.

The batteries A3 and A4 contained a less amount of the halogenated benzene in the electrolyte solution as compared with that of the battery A1. However, because LFSI was used together with LiPF$_6$ as the lithium salt of the electrolyte solution, the initial charge/discharge efficiency and the initial capacity further increased. In the batteries A3 and A4, the LFSI concentration in the electrolyte solution was 0.1 mol/L or more and 1.0 mol/L or less, and the LiPF$_6$ concentration in the electrolyte solution was 0.5 mol/L or more and 1.5 mol/L or less.

In the battery B1 in which a halogenated benzene was not contained in the electrolyte solution, the initial charge/discharge efficiency, the initial capacity, and the cycle capacity retention rate decreased.

In the batteries B2 and B3 in which the amount of the halogenated benzene (analytical value) in the electrolyte solution was greater than 500 ppm, it is considered that a coating film derived from the halogenated benzene was formed excessively on the LSX surface, and thus the initial charge/discharge efficiency, the initial capacity, and the cycle capacity retention rate decreased.

In the battery B4 in which the amount of the halogenated benzene (analytical value) in the electrolyte solution was less than 1 ppm, the effect produced by adding a halogenated benzene was small, and thus no improvement was observed in the initial charge/discharge efficiency, the initial capacity, and the cycle capacity retention rate.

In the batteries B5 and B6, because only graphite was used in the negative electrode active material and LSX was not used, the initial capacity decreased. On the other hand, the effect produced by adding a halogenated benzene was not observed.

INDUSTRIAL APPLICABILITY

The non-aqueous electrolyte secondary battery according to the present invention is useful as a main power source in a mobile communication device, a portable electronic device, or the like.

The present invention has been described by way of a preferred embodiment thereof at the present time. However, the disclosure should not be construed as limiting. Various types of variations and modifications will be apparent to those skilled in the art to which the present invention pertains by reading the disclosure given above. Accordingly, the appended claims should be construed as encompassing all the variations and modifications without departing from the true spirit and scope of the present invention.

REFERENCE SIGNS LIST

1: Electrode Group
2: Positive Electrode Lead
3: Negative Electrode Lead
4: Battery Case
5: Sealing Plate
6: Negative Electrode Terminal
7: Gasket
8: Closure

The invention claimed is:

1. A non-aqueous electrolyte secondary battery comprising:
    a positive electrode;
    a negative electrode; and
    an electrolyte solution,
    wherein the negative electrode contains a negative electrode active material that is capable of electrochemically absorbing and desorbing lithium,
    the negative electrode active material contains a lithium silicate phase and silicon particles that are dispersed in the lithium silicate phase,
    the lithium silicate phase is an oxide phase that contains lithium, silicon, and oxygen, an atomic ratio O/Si of oxygen relative to silicon in the lithium silicate phase is greater than 2 and less than 4,
    the electrolyte solution contains a halogenated benzene, and
    the amount of the halogenated benzene contained in the electrolyte solution is 1 ppm or more and 500 ppm or less.

2. The non-aqueous electrolyte secondary battery in accordance with claim 1,
    wherein the lithium silicate phase has a composition represented by the following formula: $Li_{2z}SiO_{2+z}$, where z satisfies 0<z<2.

3. The non-aqueous electrolyte secondary battery in accordance with claim 2,
    wherein z in the formula satisfies 0<z<1.

4. The non-aqueous electrolyte secondary battery in accordance with claim 1,
 wherein the halogenated benzene contains at least one selected from the group consisting of chlorobenzene, dichlorobenzene, fluorobenzene, difluorobenzene, and hexafluorobenzene.

5. The non-aqueous electrolyte secondary battery in accordance with claim 1,
 wherein the electrolyte solution contains a non-aqueous solvent and a lithium salt that is dissolved in the non-aqueous solvent, and
 the lithium salt contains at least one of $LiN(SO_2F)_2$ and $LiPF_6$.

6. The non-aqueous electrolyte secondary battery in accordance with claim 5,
 wherein the $LiN(SO_2F)_2$ concentration in the electrolyte solution is 0.1 mol/L or more and 1.0 mol/L or less.

7. The non-aqueous electrolyte secondary battery in accordance with claim 5,
 wherein the $LiPF_6$ concentration in the electrolyte solution is 0.5 mol/L or more and 1.5 mol/L or less.

8. The non-aqueous electrolyte secondary battery in accordance with claim 6,
 wherein the $LiPF_6$ concentration in the electrolyte solution is 0.5 mol/L or more and 1.5 mol/L or less.

9. The non-aqueous electrolyte secondary battery in accordance with claim 1,
 wherein the halogenated benzene contains at least one selected from the group consisting of chlorobenzene and dichlorobenzene.

* * * * *